(12) United States Patent
Hao et al.

(10) Patent No.: US 11,838,833 B2
(45) Date of Patent: Dec. 5, 2023

(54) GROUPING METHOD, APPARATUS, AND SYSTEM

(71) Applicant: HUAWEI TECHNOLOGIES CO., LTD., Guangdong (CN)

(72) Inventors: Jinping Hao, Shanghai (CN); Yinghao Jin, Shanghai (CN); Shuigen Yang, Shanghai (CN); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 407 days.

(21) Appl. No.: 17/244,340

(22) Filed: Apr. 29, 2021

(65) Prior Publication Data

US 2021/0250735 A1 Aug. 12, 2021

Related U.S. Application Data

(63) Continuation of application No. PCT/CN2019/114874, filed on Oct. 31, 2019.

(30) Foreign Application Priority Data

Nov. 2, 2018 (CN) .......................... 201811303756.8

(51) Int. Cl.
*H04W 24/02* (2009.01)
*H04W 4/08* (2009.01)
(Continued)

(52) U.S. Cl.
CPC ............ *H04W 4/08* (2013.01); *H04B 17/345* (2015.01); *H04W 24/02* (2013.01); *H04W 24/10* (2013.01); *H04W 16/18* (2013.01)

(58) Field of Classification Search
CPC ....... H04W 4/08; H04W 24/02; H04W 24/10; H04W 16/18; H04W 72/121;
(Continued)

(56) References Cited

U.S. PATENT DOCUMENTS

2018/0013594 A1 1/2018 Mukkavilli et al.

FOREIGN PATENT DOCUMENTS

| CN | 101448306 A | * | 6/2009 | ............ H04W 72/04 |
| CN | 101448306 A |   | 6/2009 | |

(Continued)

OTHER PUBLICATIONS

* Intel (Intel Corporation: "Further considerations on RIM framework", 3GPP Draft; R1-1810782, vol. RAN WG1, Sep. 2018).*

(Continued)

*Primary Examiner* — Lakeram Jangbahadur
(74) *Attorney, Agent, or Firm* — Fish & Richardson P.C.

(57) ABSTRACT

Example grouping methods, apparatuses, and systems are provided. One example method includes receiving, by a central unit, a first interference intensity indication reported by at least one distributed unit. The central unit can then group the at least one distributed unit into at least one first distributed unit group based on the first interference intensity indication. The central unit can then send, to a controller, a distributed unit grouping indication and a second interference intensity indication that corresponds to the at least one first distributed unit group, where the distributed unit grouping indication is used to indicate the at least one first distributed unit group.

28 Claims, 6 Drawing Sheets

(51) Int. Cl.
*H04B 17/345* (2015.01)
*H04W 24/10* (2009.01)
*H04W 16/18* (2009.01)

(58) Field of Classification Search
CPC . H04W 88/085; H04W 72/542; H04W 28/18; H04B 17/345; H04L 5/0091; H04L 5/0073; H04L 5/0053
See application file for complete search history.

(56) References Cited

FOREIGN PATENT DOCUMENTS

| | | | | | |
|---|---|---|---|---|---|
| CN | 102742188 | A | | 10/2012 | |
| CN | 106538037 | A | | 3/2017 | |
| CN | 107484183 | A | | 12/2017 | |
| CN | 108039903 | A | | 5/2018 | |
| CN | 108616933 | A | * | 10/2018 | ............ H04W 72/04 |
| CN | 108616933 | A | | 10/2018 | |
| KR | 20150115015 | A | | 10/2015 | |
| KR | 20180007706 | A | | 1/2018 | |
| WO | 2018009278 | A1 | | 1/2018 | |
| WO | 2018012873 | A1 | | 1/2018 | |
| WO | 2018057610 | A1 | | 3/2018 | |
| WO | 2020199938 | A1 | | 10/2020 | |

OTHER PUBLICATIONS

Chairman, "Agenda," 3GPP TSG-RAN WG3 ,#101bis, R3-18xxxx, Chengdu, China, Oct. 8-12, 2018, 111 pages.
CMCC, "New Study Item proposal: Remote Interference Management in NR," 3GPP TSG RAN Meeting #78, RP-172384, Lisbon, Portugal, Dec. 18-21, 20171 4 pages.
ETSI MCC, "Report of 3GPP TSG RAN meeting #94," 3GPP TSG RAN meeting #95, R3-170346, Athens, Greece, Feb. 13-17, 2016, 157 pages.
Extended European Search Report issued in European Application No. 19880502.0 dated Nov. 29, 2021, 9 pages.
Huawei, "Discussion on signalling design for RIM," 3GPP TSG-RAN3 Meeting #104, R3-192679, Reno, Nevada, USA, May 13-17, 2019, 3 pages.
Huawei, "gNB grouping and set ID assignment," 3GPP TSG-RAN3 Meeting #102, R3-186493, Spokane, USA, Nov. 12-16, 2018, 2 pages.
Intel Corporation, "Further considerations on RIM framework," 3GPP TSG RAN WG1 Meeting #94bis, R1-1810782, Chengdu, China, Oct. 8-12, 2018, 4 pages.
Office Action issued in Chinese Application No. 201811303756.8 dated Feb. 23, 2021, 12 pages (with English translation).
PCT International Search Report and Written Opinion issued in International Application No. PCT/CN2019/114874 dated Jan. 22, 2020, 17 pages (with English translation).
CMCC, "Updated summary for NR-RIM," 3GPP TSG RAN WG1 Meeting #94bis, R1-1812060, Chengdu, China, Oct. 8-12, 2018, 37 pages.
Office Action in Korean Appln. No. 10-2021-7016181, dated May 25, 2023, 8 pages (with English translation).
Office Action issued in Indian Application No. 202117020958 dated Feb. 23, 2022, 6 pages.

* cited by examiner

GROUPING METHOD, APPARATUS, AND SYSTEM

CROSS-REFERENCE TO RELATED APPLICATIONS

This application is a continuation of International Application No. PCT/CN2019/114874, filed on Oct. 31, 2019, which claims priority to Chinese Patent Application No. 201811303756.8, filed on Nov. 2, 2018. The disclosures of the aforementioned applications are hereby incorporated by reference in their entireties.

TECHNICAL FIELD

This application relates to the field of communications technologies, and in particular, to a grouping method, an apparatus, and a system.

BACKGROUND

In a special atmospheric condition, electromagnetic waves transmitted in the atmosphere are affected by atmospheric refraction, and propagation paths of the electromagnetic waves bend toward the ground. When a curvature of the propagation path exceeds a surface curvature of the earth, a part of the electromagnetic waves are trapped in a thin atmospheric layer with a specific thickness. This phenomenon is similar to that electromagnetic waves are propagated in a waveguide, and is referred to as an atmospheric duct phenomenon. Due to an existence of the atmospheric duct phenomenon, a downlink signal sent by a base station in an area A may be propagated to an area B. A distance between the area B and the area A may be up to 300 kilometers. If a base station in the area B is performing uplink transmission, the downlink signal propagated from the area A to the area B causes interference to the uplink transmission performed by the base station in the area B. Generally, this interference is referred to as remote interference (RI). The area A is an aggressor area, and the area B is a victim area.

Remote interference management (RIM) is a technical solution proposed to eliminate the remote interference. For example, as shown in FIG. 1, a base station includes a central unit (CU) and at least one distributed unit (DU). A structure of the base station shown in FIG. 1 is used as an example. Currently, a remote interference management process is shown in FIG. 2, and specifically includes the following operations. Operation 1: A downlink signal sent by a DU in an aggressor area causes remote interference to receiving of an uplink signal by a DU of a base station in a victim area. Operation 2: The DU of the base station in the victim area sends a reference signal (RS) to the DU of a base station in the aggressor area through an air interface. Operation 3: A CU of the base station in the aggressor area detects that the DU receives the RS, sends, to a CU of the base station in the victim area by using a backhaul network, a notification indicating that the RS is received, and executes remote interference mitigation schemes (remote interference mitigation schemes). Operation 4: When detecting that the DU does not receive the RS within a long time, the CU of the base station in the aggressor area stops executing the remote interference mitigation schemes, stops RS detection, and sends, to the CU of the base station in the victim area, a notification for stopping sending the RS. Operation 5: The CU of the base station in the victim area receives the notification for stopping sending the RS, and notifies the DU to stop sending the RS. In addition, the remote interference management process may alternatively be shown in FIG. 3. A difference from the remote interference management process shown in FIG. 2 lies in that, after receiving the notification that is sent by the CU of the base station in the aggressor area and that indicates that the RS is received, the CU of the base station in the victim area sends remote interference assistance information to the CU of the base station in the aggressor area, to cooperate with the CU of the base station in the aggressor area to execute the remote interference mitigation schemes, thereby eliminating the remote interference.

It can be learned from the foregoing content that, if the remote interference management process is performed for each DU, a relatively large amount of information processed by the CU is easily caused, and performance of the base station is reduced. Therefore, how to implement DU grouping is of great significance to reduce the amount of information processed by the CU in the remote interference management process.

SUMMARY

This application provides a grouping method, an apparatus, and a system, to help group distributed units, so that when being applied to a remote interference management process, embodiments of this application help reduce an amount of information processed by a CU, thereby improving performance of a base station.

According to a first aspect, a grouping method in an embodiment of this application includes: A central unit receives an interference intensity indication reported by at least one distributed unit; and then groups the at least one distributed unit into at least one first distributed unit group based on the interference intensity indication reported by the at least one distributed unit.

In this embodiment of this application, the distributed unit is grouped by using the interference intensity indication, to help group distributed units that suffer same or similar interference into one group, thereby helping perform unified management on same or similar distributed units, and improving efficiency of managing the interfered distributed units.

In a possible design, the central unit sends, to a controller, a distributed unit grouping indication and an interference intensity indication that corresponds to the at least one first distributed unit group. The distributed unit grouping indication is used to indicate the at least one first distributed unit group. In this way, DUs of a plurality of base stations are grouped.

In a possible design, the central unit groups the at least one distributed unit into the at least one first distributed unit group based on the interference intensity indication reported by the at least one distributed unit and a historical interference intensity indication report record. According to the foregoing technical solution, the distributed units are more reliably grouped.

In a possible design, the interference intensity indication reported by the at least one distributed unit is received by the central unit within duration specified for a timing clock. The timing clock is started when the central unit receives the first interference intensity indication. In this way, an amount of information processed by the central unit is reduced.

In a possible design, the central unit periodically receives the interference intensity indication reported by the at least one distributed unit. In this way, an implementation of the central unit is simplified.

In a possible design, the central unit receives at least one specific identifier. Each of the at least one specific identifier is used to identify a second distributed unit group, and second distributed unit groups identified by different specific identifiers are different. The second distributed unit group is determined by the controller based on a distributed unit grouping indication and an interference intensity indication that are reported by at least one central unit. In this way, the central unit learns that DU grouping is completed.

In a possible design, the central unit sends, to the at least one distributed unit, a notification for suspending the report of the interference intensity indication. In this way, after initiating a remote interference management process, the distributed unit no longer groups the DUs, thereby reducing a possibility that an error occurs in the remote interference management process.

In a possible design, the specific identifier is associated with an identifier of the central unit.

In a possible design, after receiving a notification indicating that the remote interference management process ends, the central unit sends, to the at least one distributed unit, a notification for reporting the interference intensity indication. In this way, the distributed unit can perform a corresponding operation or a remote interference reporting operation again after the remote interference management process ends.

According to a second aspect, an indication reporting method in an embodiment of this application includes: A distributed unit obtains a first parameter value through measurement. The first parameter value is used to indicate an intensity of interference suffered by the distributed unit. The distributed unit reports an interference intensity indication to a central unit or a controller. The interference intensity indication is determined based on the first parameter value.

In this embodiment of this application, the distributed unit may report the interference intensity indication by obtaining the first parameter value through measurement, thereby helping the distributed unit or the controller group the distributed unit.

In a possible design, the distributed unit may periodically obtain the first parameter value through measurement, or the distributed unit may perform an operation of obtaining the first parameter value through measurement based on indication information, sent by the central unit, for measuring the interference intensity. It should be noted that, the central unit may send, to the distributed unit based on configuration information, the indication information for measuring the interference intensity.

In a possible design, when a first parameter value obtained through measurement in an $i^{th}$ periodicity is greater than a first threshold, the distributed unit reports an interference intensity indication in the $i^{th}$ periodicity to the central unit or the controller. i is a positive integer. According to the foregoing technical solution, an amount of information processed by the central unit or the controller is reduced, and device performance is improved.

In a possible design, after the distributed unit reports the interference intensity indication in the $i^{th}$ periodicity to the central unit or the controller, when a difference between a first parameter value obtained through measurement in a $j^{th}$ periodicity and the first parameter value obtained through measurement in the $i^{th}$ periodicity is greater than a second threshold, or when a first parameter value obtained through measurement in a $j^{th}$ periodicity is less than a third threshold, the distributed unit reports an interference intensity indication in the $j^{th}$ periodicity to the central unit or the controller.

j is a positive integer greater than i. In this way, reliability of grouping performed by the distributed unit or the controller is improved.

In a possible design, the distributed unit periodically reports the interference intensity indication to the central unit or the controller. A periodicity in which the distributed unit reports the interference intensity indication is different from a periodicity in which the distributed unit obtains the first parameter value through measurement, or a periodicity in which the distributed unit reports the interference intensity indication is the same as a periodicity in which the distributed unit obtains the first parameter value through measurement. In this way, an implementation is simplified.

In a possible design, after receiving a notification, sent by the central unit or the controller, for reporting the interference intensity indication, the distributed unit reports the interference intensity indication to the central unit or the controller. In this way, the central unit or the controller can control an occasion for the distributed unit to report the interference intensity indication, thereby improving flexibility.

In a possible design, when receiving a notification, sent by the central unit or the controller, for suspending the report of the interference intensity indication, the distributed unit suspends the measurement for obtaining the first parameter value, or suspends the report of the interference intensity indication to the distributed unit. In this way, the central unit or the controller can control an occasion for the distributed unit to suspend the report of the interference intensity indication, thereby further improving the flexibility.

In a possible design, the first parameter value is an interference over thermal IoT. In this way, the implementation is simplified.

In a possible design, the interference intensity indication is the first parameter value; or the interference intensity indication is a value obtained after the first parameter value is quantized; or the interference intensity indication is an interference intensity level corresponding to the first parameter value. In this way, the implementation is simplified.

According to a third aspect, another grouping method in an embodiment of this application includes: A controller receives a distributed unit grouping indication and an interference intensity indication that corresponds to at least one first distributed unit group that are sent by each of N central units. N is a positive integer. Then the controller determines M second distributed unit groups based on the distributed unit grouping indication and the interference intensity indication that corresponds to the at least one first distributed unit group that are sent by each of the N central units. M is a positive integer. The controller allocates M specific identifiers. One of the M specific identifiers is used to identify one of the M second distributed unit groups.

In this embodiment of this application, the controller groups distributed units of a plurality of base stations based on information reported by the plurality of distributed units, to help perform unified management on distributed units, suffering interference with same or similar intensities, in the plurality of base stations, thereby improving efficiency of managing the interfered distributed units.

In a possible design, the controller sends, for a first specific identifier in the M specific identifiers, the first specific identifier to at least one of the N central units. The at least one of the N central units is configured to manage a distributed unit included in a second distributed unit group identified by the first specific identifier. Alternatively, the controller sends, for a first specific identifier in the M specific identifiers, the first specific identifier to a distributed unit included in a second distributed unit group identified by the first specific identifier. The first specific identifier is any one of the M specific identifiers. According to the foregoing technical solution, a base station side obtains a completion status of grouping the distributed units by the controller.

In a possible design, after allocating the M specific identifiers, the controller further sends, to at least one distributed unit, a notification for suspending report of an interference intensity indication. In this way, the controller can control an occasion for the distributed unit to suspend the report of the interference intensity indication, thereby improving flexibility. It should be noted that, the controller may directly send, to the at least one distributed unit, the notification for suspending the report of the interference intensity indication, or may send, to the at least one distributed unit by using the central unit, the notification for suspending the report of the interference intensity indication.

In a possible design, the controller may further send, to the distributed unit, a notification for reporting the interference intensity indication. In this way, the controller can control an occasion for the distributed unit to report the interference intensity indication, thereby improving the flexibility. It should be understood that, the controller may determine, based on a preconfigured policy, to send, to the central unit, the notification for reporting the interference intensity indication.

In a possible design, the controller establishes an identifier relationship matching table for each of the M specific identifiers. The identifier relationship matching table includes at least a correspondence between a specific identifier and an identifier of a distributed unit, or a correspondence between a specific identifier and an identifier of a central unit.

In a possible design, the controller determines, for each of the M specific identifiers, a specific central unit in at least one central unit configured to manage a distributed unit included in a second distributed unit group. The specific central unit is configured to perform information exchange with an aggressor in a remote interference management process for the second distributed unit group. In this way, remote interference management of a plurality of DUs is implemented.

In a possible design, the specific central unit is configured to manage at least a largest quantity of distributed units, or a distributed unit that suffers greatest interference. In this way, an implementation is simplified.

In a possible design, the controller includes an operation, administration and maintenance OAM function.

According to a fourth aspect, another grouping method in an embodiment of this application includes: A controller receives an interference intensity indication reported by at least one distributed unit; and then groups the at least one distributed unit into M distributed unit groups based on the interference intensity indication reported by the at least one distributed unit. M is a positive integer. The controller allocates M specific identifiers. Each of the M specific identifiers is used to identify one of the M distributed unit groups.

In this embodiment of this application, the controller groups distributed units of a plurality of base stations based on information reported by a plurality of central units, to help perform unified management on distributed units, suffering interference with same or similar intensities, in the plurality of base stations, thereby improving efficiency of managing the interfered distributed units.

In a possible design, the controller sends, for a first specific identifier in the M specific identifiers, the first specific identifier to at least one central unit. The at least one central unit is configured to manage a distributed unit included in a distributed unit group identified by the first specific identifier. Alternatively, the controller sends, for a first specific identifier in the M specific identifiers, the first specific identifier to a distributed unit included in a distributed unit group identified by the first specific identifier. The first specific identifier is any one of the M specific identifiers. According to the foregoing technical solution, a base station side obtains a completion status of grouping, by the controller, the distributed units.

In a possible design, after allocating the M specific identifiers, the controller further sends, to the at least one distributed unit, a notification for suspending the report of the interference intensity indication. In this way, the controller can control an occasion for the distributed unit to suspend the report of the interference intensity indication, thereby improving flexibility. It should be noted that, the controller may directly send, to the at least one distributed unit, the notification for suspending the report of the interference intensity indication, or may send, to the at least one distributed unit by using the central unit, the notification for suspending the report of the interference intensity indication.

In a possible design, the controller may further send, to the distributed unit, a notification for reporting the interference intensity indication. In this way, the controller can control an occasion for the distributed unit to report the interference intensity indication, thereby improving the flexibility. It should be understood that, the controller may determine, based on a preconfigured policy, to send, to the central unit, the notification for reporting the interference intensity indication.

In a possible design, the controller establishes an identifier relationship matching table for each of the M specific identifiers. The identifier relationship matching table includes at least a correspondence between a specific identifier and an identifier of a distributed unit, or a correspondence between a specific identifier and an identifier of a central unit.

In a possible design, the controller determines, for each of the M specific identifiers, a specific central unit in at least one central unit configured to manage a distributed unit included in a distributed unit group. The specific central unit is configured to perform information exchange with an aggressor in a remote interference management process. In this way, remote interference management of a plurality of DUs is implemented.

In a possible design, the specific central unit is configured to manage at least a largest quantity of distributed units, or a distributed unit that suffers greatest interference. In this way, an implementation is simplified.

In a possible design, the controller includes an operation, administration and maintenance OAM function.

According to a fifth aspect, a method for managing information exchange between base stations based on remote interference in an embodiment of this application includes: A first central unit detects and receives a reference signal sent by a distributed unit in a victim area. The first central unit is located in an aggressor area. The reference signal includes a first specific identifier. The first specific identifier is used to identify a distributed unit group to which the distributed unit belongs, and an identifier of the second central unit is associated with the distributed unit group identified by the first specific identifier. The first central unit sends a first message to the second central unit. The first message includes a second specific identifier. The second specific identifier is used to identify a distributed unit group associated with an identifier of the first central unit.

In this embodiment of this application, the first message carries the second specific identifier, so that the second central unit in the victim area can obtain a specific identifier associated with the first central unit, thereby helping simplify a manner in which the second central unit obtains the specific identifier in the aggressor area.

In a possible design, the first central unit sends the first message to the second central unit through an NGAP interface, or the first central unit sends the first message to the second central unit through an XnAP interface. In this way, an implementation is simplified.

According to a sixth aspect, an embodiment of this application provides an apparatus. The apparatus provided in this application has functions for implementing behavior of the central unit, the distributed unit, or the controller in the foregoing method aspects, and includes corresponding means configured to perform the operations or functions described in the foregoing method aspects. The operations or functions may be implemented by using software, hardware (for example, a circuit), or a combination of hardware and software.

In a possible design, the apparatus includes one or more processors, one or more memories, and a communications unit. The memory is configured to couple to the processor, and stores program instructions and data required by the apparatus. The one or more memories may be integrated with the processors, or may be disposed independent of the processors. This is not limited in this application. The one or more processors are configured to support the apparatus in performing the corresponding functions of the central unit, the distributed unit, or the controller in the foregoing methods. The communications unit may be a transceiver or a transceiver circuit. Optionally, the transceiver may alternatively be an input/output circuit, or an interface. The communications unit is configured to receive and send information.

The apparatus may be a communications device, or a chip.

In another possible design, the apparatus includes a transceiver, a processor, and a memory. The processor is configured to control the transceiver or an input/output circuit to receive and send a signal. The memory is configured to store a computer program. The processor is configured to run the computer program in the memory, so that the apparatus performs the method completed in a centralized manner according to any one of the first aspect or the possible designs of the first aspect, or performs the method completed by the distributed unit according to any one of the second aspect or the possible designs of the second aspect, or performs the method completed by the controller according to any one of the third aspect or the possible designs of the third aspect, or performs the method completed by the controller according to any one of the fourth aspect or the possible designs of the fourth aspect, or performs the method completed by the first central unit according to any one of the fifth aspect or the possible designs of the fifth aspect.

According to a seventh aspect, an embodiment of this application provides an apparatus. The apparatus includes a transceiver and a processor. The transceiver is configured to receive an interference intensity indication reported by at least one distributed unit. The processor is configured to group the at least one distributed unit into at least one first distributed unit group based on the interference intensity indication reported by the at least one distributed unit. The transceiver is further configured to send, to a controller, a distributed unit grouping indication and an interference intensity indication that corresponds to the at least one first distributed unit group. The distributed unit grouping indication is used to indicate the at least one first distributed unit group.

In a possible design, the processor is specifically configured to group the at least one distributed unit into the at least one first distributed unit group based on the interference intensity indication reported by the at least one distributed unit and a historical interference intensity indication report record.

In a possible design, the interference intensity indication reported by the at least one distributed unit is received by the transceiver within duration specified for a timing clock. The timing clock is started when the transceiver receives the first interference intensity indication.

In a possible design, the transceiver is specifically configured to periodically receive the interference intensity indication reported by the at least one distributed unit.

In a possible design, the transceiver is further configured to receive at least one specific identifier. Each of the at least one specific identifier is used to identify a second distributed unit group, and second distributed unit groups identified by different specific identifiers are different. The second distributed unit group is determined by the controller based on a distributed unit grouping indication and an interference intensity indication that are reported by at least one central unit.

In a possible design, after receiving the at least one specific identifier, the transceiver is further configured to send, to the at least one distributed unit, a notification for suspending the report of the interference intensity indication.

In a possible design, the specific identifier is associated with an identifier of the central unit.

In a possible design, after receiving a notification indicating that a remote interference management process ends, the transceiver is further configured to send, to the at least one distributed unit, a notification for reporting the interference intensity indication.

According to an eighth aspect, another apparatus in an embodiment of this application includes a transceiver and a processor. The transceiver is configured to receive a distributed unit grouping indication and an interference intensity indication that corresponds to at least one first distributed unit group that are sent by each of N central units. N is a positive integer. The processor is configured to: determine M second distributed unit groups based on the distributed unit grouping indication and the interference intensity indication that corresponds to the at least one first distributed unit group that are sent by each of the N central units, where M is a positive integer; and allocate M specific identifiers, where one of the M specific identifiers is used to identify one of the M second distributed unit groups.

In a possible design, the transceiver is further configured to send, for a first specific identifier in the M specific identifiers, the first specific identifier to at least one of the N central units. The at least one of the N central units is configured to manage a distributed unit included in a second distributed unit group identified by the first specific identifier. Alternatively, the transceiver is further configured to send, for a first specific identifier in the M specific identifiers, the first specific identifier to a distributed unit included in a second distributed unit group identified by the first specific identifier. The first specific identifier is any one of the M specific identifiers.

In a possible design, the processor is further configured to establish an identifier relationship matching table for each of the M specific identifiers. The identifier relationship matching table includes at least a correspondence between a specific identifier and an identifier of a distributed unit, or a correspondence between a specific identifier and an identifier of a central unit.

In a possible design, the processor is further configured to determine, for each of the M specific identifiers, a specific central unit in at least one central unit configured to manage a distributed unit included in a second distributed unit group. The specific central unit is configured to perform information exchange with an aggressor in a remote interference management process for the second distributed unit group.

In a possible design, the specific central unit is configured to manage at least a largest quantity of distributed units, or a distributed unit that suffers greatest interference.

In a possible design, the controller includes an operation, administration and maintenance OAM function.

According to a ninth aspect, a system is provided. The system includes the apparatus according to any one of the seventh aspect or the possible designs of the seventh aspect, and the apparatus according to any one of the eighth aspect or the possible designs of the eighth aspect.

According to a tenth aspect, a computer-readable storage medium is provided. The computer-readable storage medium is configured to store a computer program. The computer program includes an instruction used to perform the method according to any one of the first aspect or the possible designs of the first aspect, or an instruction used to perform the method according to any one of the second aspect or the possible designs of the second aspect, or an instruction used to perform the method according to any one of the third aspect or the possible designs of the third aspect, or an instruction used to perform the method according to any one of the fourth aspect or the possible designs of the fourth aspect, or an instruction used to perform the method according to any one of the fifth aspect or the possible designs of the fifth aspect.

According to an eleventh aspect, a computer program product is provided. The computer program product includes computer program code. When the computer program code is run on a computer, the computer is enabled to perform the method according to any one of the first aspect or the possible designs of the first aspect, or perform the method according to any one of the second aspect or the possible designs of the second aspect, or perform the method according to any one of the third aspect or the possible designs of the third aspect, or perform the method according to any one of the fourth aspect or the possible designs of the fourth aspect, or perform the method according to any one of the fifth aspect or the possible designs of the fifth aspect.

DESCRIPTION OF EMBODIMENTS

It should be understood that, in embodiments of this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "I" generally indicates an "or" relationship between associated objects. The term "at least one piece (item) of the following" or a similar expression thereof means any combination of these items, including any combination of a singular item (piece) or plural items (pieces). For example, at least one (piece) of a, b, or c may indicate the following cases: a, b, c, a and b, a and c, b and c, or a, b, and c, where a, b, and c may be singular or plural.

The embodiments of this application may be applied to, but are not limited to, a next-generation wireless communications (NR) system, or may be applied to a communications system such as a time division duplex long time evolution (TDD-LTE) system, or may be extended to a related cellular system such as a wireless fidelity (Wi-Fi) system, a worldwide interoperability for microwave access (wimax) system, a future wireless communications system, and a 3rd generation partnership project (3GPP) system. For example, an architecture of a communications system in the embodiments of this application may be shown in FIG. 4, and includes a core network device, an access network device, and a terminal. It should be noted that, a quantity of core network devices, a quantity of access network devices, and a quantity of terminals in the mobile communications system are not limited in the embodiments of this application. In addition, the communications system shown in FIG. 4 may further include other devices, such as a relay device and a backhaul device. This is also not limited in the embodiments of this application. In addition, in a specific implementation, functions of the core network device and functions of the access network device in the communications system shown in FIG. 4 may be separately integrated into mutually independent physical devices, or may be integrated into one physical device, or some functions of the core network device and some functions of the access network device may be integrated into one physical device. This is not limited in the embodiments of this application. In addition, in the communications system shown in FIG. 4, the terminal may be connected to the access network device in a wireless manner, and the access network device may be connected to the core network device in a wireless manner or a wired manner. It should be further noted that, the terminal in the communications system shown in FIG. 4 may be fixed or movable.

Figure 4:
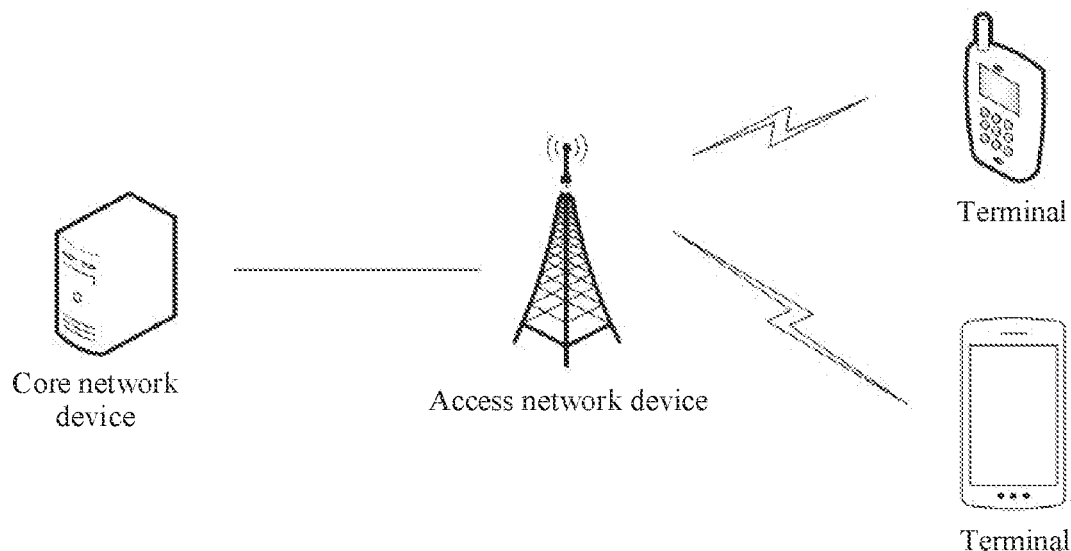
FIG. 4 is a schematic diagram of an architecture of a communications system according to an embodiment of this application.

It should be understood that, the core network device in the embodiments of this application is configured to provide an access management function and a mobility management function. For example, when the communications system shown in FIG. 4 is an NR system, the core network device may be an access and mobility management function (AMF). For another example, when the communications system shown in FIG. 4 is a 4G communications system, the core network device may be a mobility management entity (MME).

It should be understood that, the access network device in the embodiments of this application is configured to connect the terminal to a wireless network. The access network device may be referred to as a base station, or may be referred to as a radio access network (RAN) node (or device). For example, the access network device may be a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home Node B, HNB), a baseband unit (BBU), or a wireless fidelity (Wi-Fi) access point (AP).

Figure 1:
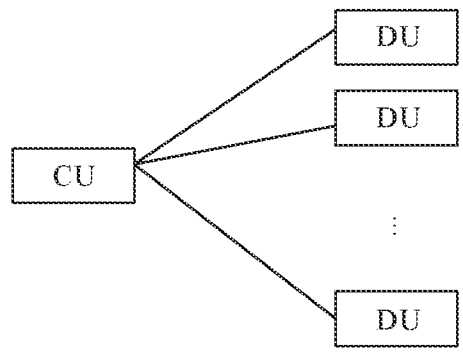
FIG. 1 is a schematic structural diagram of a base station.

A structure of the access network device to which the embodiments of this application are applied is shown in FIG. 1. Specifically, the access network device includes a central unit (CU) and at least one distributed unit (DU). The CU may be configured to manage or control the at least one DU, in other words, the CU is connected to the at least one DU. In this structure, protocol layers of the access network device in the communications system may be split. A part of the protocol layers are controlled by the CU in a centralized manner, and functions of a part or all of remaining protocol layers are distributed in the DU. The CU controls the DU in a centralized manner. For example, the access network device is a gNB. Protocol layers of the gNB include a radio resource control (RRC) layer, a service data adaptation protocol (SDAP) layer, a packet data convergence protocol (PDCP) layer, a radio link control (RLC) layer, a media access control layer (MAC) layer, and a physical layer. The CU is configured to implement functions of the RRC layer, the SDAP layer, and the PDCP layer, and the DU is configured to implement functions of the RLC layer, the MAC layer, and the physical layer.

Figure 5A:
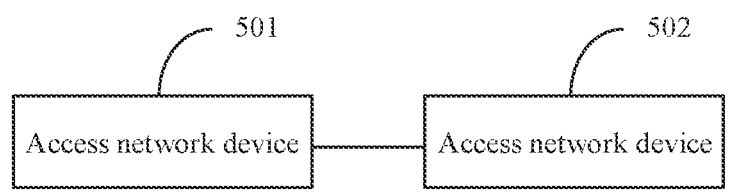
FIG. 5a is a schematic diagram of a connection mode of an access network device according to an embodiment of this application.
Figure 5B:
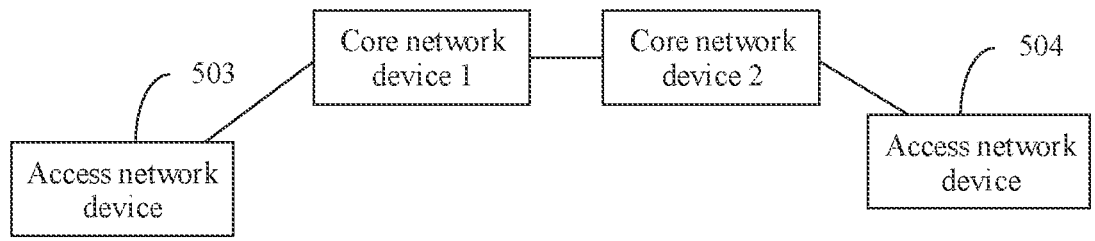
FIG. 5b is a schematic diagram of a connection mode of an access network device according to an embodiment of this application.

It should be understood that, in the embodiments of this application, access network devices may directly communicate with each other. For example, as shown in FIG. 5a, an access network device 501 and an access network device 502 directly communicate with each other. For example, the access network device 501 and the access network device 502 may communicate with each other through an Xn interface. In the embodiments of this application, access network devices may alternatively communicate with each other by using a core network. For example, as shown in FIG. 5b, an access network device 503 and an access network device 504 communicate with each other by using a core network device 1 and a core network device 2. The core network device 1 is configured to manage the access network device 503, and the core network device 2 is configured to manage the access network device 504. It should be noted that, the core network device 1 and the core network device 2 may be a same core network device, or may be different core network devices. Communication between the access network device 503 and the core network device 1 is used as an example. The access network device 503 may communicate with the core network device 1 through an NG interface, or may communicate with the core network device 1 in another manner.

It should be understood that, the terminal in the embodiments of this application may also be referred to as a terminal device, user equipment (UE), a mobile station (MS), a mobile terminal (MT), or the like, and is a device that provides voice and/or data connectivity for a user. For example, the terminal may be a handheld device that has a wireless connection function or a vehicle-mounted device. The following are some examples of the terminal: a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, and the like.

The following uses a gNB as an example to describe the embodiments of this application in detail.

In the embodiments of this application, the gNB includes one CU and at least one DU. Degrees of remote interference suffered by different DUs may be different. To simplify remote interference management, in the embodiments of this application, the DUs may be grouped, and then the remote interference management is performed for different groups of DUs.

Embodiment 1

The DU may report an interference intensity indication, so that the CU groups the DU. Then the CU sends a DU grouping status and the interference intensity indication to a controller. The controller may further group, based on the status of grouping the DU by the CU and the interference intensity indication, a DU in at least one gNB in a victim area again, to enable the CU to perform a remote interference management process for each DU group, thereby helping reduce an amount of processed information, and improving performance of a base station. It should be noted that, the controller in the embodiments of this application may be a device, including an operation, administration and maintenance (OAM) function, in a communications system, or may be a new device independently disposed in a communications system. Alternatively, a function of the controller may be integrated into an existing device (such as a core network device) in a communications system, or the like. This is not limited herein.

Figure 6:
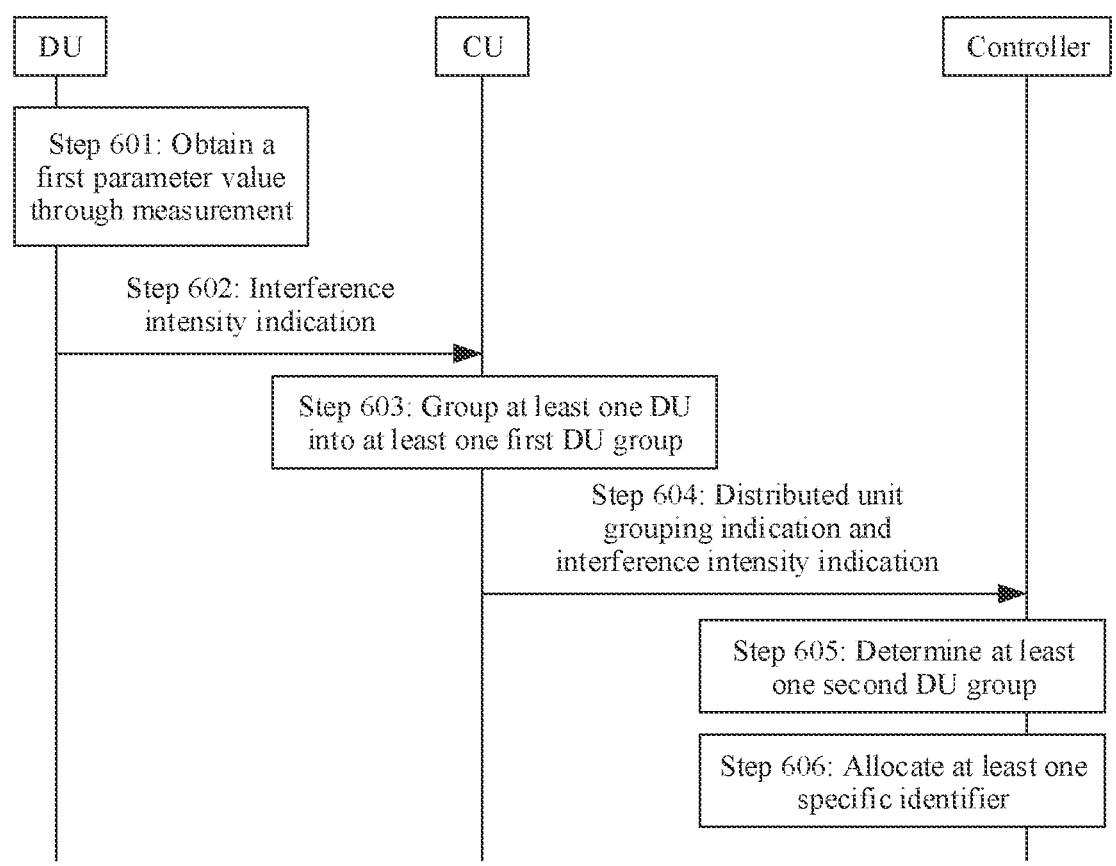
FIG. 6 is a schematic flowchart of a grouping method according to an embodiment of this application.

Specifically, a grouping method in Embodiment 1 of this application may be shown in FIG. 6, and the grouping method includes the following operations:

Operation 601: The DU obtains a first parameter value through measurement, where the first parameter value is used to indicate an intensity of interference suffered by the DU.

It should be noted that, the DU may periodically obtain the first parameter value through measurement, or may obtain the first parameter value through measurement based on a configuration performed by the CU or the controller. For example, when the DU periodically obtains the first parameter value through measurement, a periodicity in which the DU obtains the first parameter value through measurement may be a frame, a subframe, a symbol, or the like, or may be preset duration. This is not limited herein. It should further be noted that, the first parameter value may be an interference over thermal (IoT), or may be another physical quantity, for example, a bit error rate, that can be used to indicate a degree of the interference suffered by the DU.

It should be understood that, when the DU suffers remote interference, the first parameter value is used to indicate an intensity of the remote interference suffered by the DU. When the DU suffers other interference (for example, interference, caused by downlink transmission of the DU, to uplink transmission of the DU), the first parameter value is used to indicate an intensity of the other interference suffered by the DU. A type of the interference suffered by the DU is not limited in this embodiment of this application.

Operation 602: The DU reports the interference intensity indication to the CU, where the interference intensity indication is determined based on the first parameter value.

In some embodiments, the interference intensity indication may be the first parameter value, a value obtained after the first parameter value is quantized, an interference level corresponding to the first parameter, or the like. For example, when the interference intensity indication is a value obtained after the first parameter value is quantized, a quantizing policy may be preset. The DU determines the interference intensity indication according to the preset quantizing policy and based on the first parameter value. For example, the value obtained after the quantizing may be from 0 to 1. It should be noted that, the quantizing policy may be uniform quantizing or non-uniform quantizing. For example, the first parameter value is the IoT value. If the preset quantizing policy is that: When the IoT value is (30, 40], a corresponding value obtained after the quantizing is 0.5, when the IoT value is (40, 50], a corresponding value obtained after the quantizing is 0.6, and so on. In this case, when the IoT value is 35, the interference intensity indication is 0.5. For another example, when the interference intensity indication is the interference level corresponding to the first parameter value, a correspondence between an intensity of remote interference suffered by the DU and an interference level may be preset. For example, the interference level may include two levels, or may include four levels, or may include more levels. This is not limited herein. For example, when the interference level includes two levels, each level may be indicated by using one bit. For example, an interference level is indicated by using 1, and the other interference level is indicated by using 0. For another example, when the interference level includes four levels, each level may be indicated by using two bits. For example, 00, 01, 10, and 11 are separately used to indicate an interference level. For another example, the interference level may alternatively be high, medium, or low. Specifically, a correspondence between the first parameter value and each of the high interference level, the medium interference level, and the low interference level may be preset.

It should be noted that, in operation 602, the DU may report the interference intensity indication to the CU in an event-triggered manner, or may periodically report the interference intensity indication.

When the DU reports the interference intensity indication to the CU in the event-triggered manner, when a first parameter value obtained through measurement in an $i^{th}$ periodicity is greater than a first threshold, the DU may report an interference intensity indication in the $i^{th}$ periodicity to the CU. In this case, if all first parameter values obtained through measurement by the DU before the $i^{th}$ periodicity are less than or equal to the first threshold, the DU may not report the interference intensity indication to the CU. i is a positive integer.

In some embodiments, after the DU reports the interference intensity indication in the $i^{th}$ periodicity, if a difference between a first parameter value obtained through measurement in a $j^{th}$ periodicity and the first parameter value obtained through measurement in the $i^{th}$ periodicity is greater than a second threshold, or if a first parameter value obtained through measurement in a $j^{th}$ periodicity is less than a third threshold, the DU reports an interference intensity indication in the $j^{th}$ periodicity to the CU. j is a positive integer greater than i. In this way, the CU can learn of a change in the intensity of the interference suffered by the DU, and the CU can group the DU based on a condition obtained after the intensity of the interference suffered by the DU changes. It should be noted that, in Embodiment 1 of this application, the first threshold and the third threshold may be the same, or may be different. For example, after the DU reports the interference intensity indication in the $i^{th}$ periodicity, if the first parameter value obtained through measurement in the $j^{th}$ periodicity is less than the third threshold, the interference intensity indication, reported to the CU, in the $j^{th}$ periodicity may indicate that an intensity of interference suffered by the DU is 0, or interference suffered by the DU is eliminated.

When the DU periodically reports the interference intensity indication to the CU, a periodicity in which the DU reports the interference intensity indication and a periodicity in which the DU obtains the first parameter value through measurement may be the same, or may be different. This is not limited herein. For example, the DU may report the interference intensity indication to the CU after obtaining the first parameter value through periodic measurement, or the DU may report the interference intensity indication to the CU after obtaining a plurality of first parameter values through measurement. For example, if the DU reports the interference intensity indication to the CU after obtaining the plurality of first parameter values through measurement, the DU may determine the interference intensity indication based on the plurality of first parameter values, or may determine the interference intensity indication based on a first parameter value obtained through latest measurement.

In some embodiments, the DU may report a first message carrying the interference intensity indication to the CU. The first message may be an existing message, or may be a newly defined message. It should be noted that, the DU may report the first message to the CU through an F1 interface.

For example, when the first message is a newly defined message, a operation in which a DU reports a first message to a CU may be defined in a communications protocol. For example, the operation, in which the DU reports the first message to the CU, defined in the communications protocol may be a new class 2 element procedure. For example, the newly defined class 2 element procedure may be referred to as a remote interference management IoT indication procedure (RIM IoT Indication procedure), where the first message may be a RIM IOT INDICATION message. In a specific implementation, the new class 2 element procedure may be defined by defining Table 1 in the communications protocol.

TABLE 1

| Elementary procedure | Message |
|---|---|
| RIM IoT Indication | RIM IOT INDICATION |

The RIM IOT INDICATION message includes at least an interference intensity indication. It should be understood that, the interference intensity indication is an information element or an element (IE) included in the RIM JOT INDICATION message. Specifically, when the first parameter value is an IoT value, the interference intensity indication may also be referred to as an IoT information IE. A name of the interference intensity indication is not limited in this embodiment of this application. The IoT information IE is reported by the DU in the gNB to the CU, and the IoT information IE is an information element that needs to be included in the RIM IOT INDICATION message. That the RIM IOT INDICATION message includes at least the IoT information IE may be defined by defining Table 2 in the communications protocol.

TABLE 2

| IE/Group name | Presence |
|---|---|
| IoT information | M |

It should be noted that, in Table 2, that Presence is M indicates that the RIM IOT INDICATION message needs to include the IoT information IE.

In this embodiment of this application, when the gNB includes a plurality of DUs, for a manner in which each DU reports an interference intensity indication, refer to operation 601 and operation 602.

Operation 603: The CU receives an interference intensity indication reported by at least one DU, and groups the at least one DU into at least one first DU group based on the interference intensity indication reported by the at least one DU.

In some embodiments, the CU may receive the interference intensity indication reported by the at least one DU in the following manners:

After receiving the first interference intensity indication, the CU starts a timing clock, and receives the interference intensity indication reported by the DU. After the timing clock expires, the CU groups the at least one DU into the at least one first DU group based on the interference intensity indication, received within duration specified for the timing clock, reported by the at least one DU. For example, the CU may further suspend receiving an interference intensity indication after the timing clock ends. After receiving the first interference intensity indication again, the CU may restart the timing clock, and receive the interference intensity indication reported by the DU, to update DU grouping.

In some other embodiments, the CU may alternatively periodically receive the interference intensity indication reported by the at least one DU. The periodicity in which the CU receives the interference intensity indication may be preset, or may be determined based on a preset algorithm. For example, if duration of the periodicity is one minute, the CU may group the at least one DU into the at least one first DU group based on an interference intensity indication, received within one minute, reported by the at least one DU.

Because the interference intensity indication reported by the distributed unit is received by the CU within specified duration, a DU may report a plurality of interference intensity indications within the specified duration. In this case, the CU may group the DU based on a latest interference intensity indication reported by the DU within the specified duration, to help improve reliability of the grouping. For example, the specified duration is 4:00 to 4:01, and the gNB includes a DU 1, a DU 2, and a DU 3. The DU 3 reports an interference intensity indication to the CU at 4:00:05, reports an interference intensity indication to the CU at 4:00:15, and reports an interference intensity indication to the CU at 4:00:50. When the CU groups the DUs, an interference intensity indication used for the DU 3 is the interference intensity indication reported by the DU 3 at 4:00:50.

In this embodiment of this application, the CU may group DUs whose interference intensity indications are the same or similar into one group. For example, when an interference intensity is a value obtained after the first parameter value is quantized, DUs are grouped into one group, where a difference between interference intensity indications of the DUs is less than a specified threshold. Specifically, the threshold may be correspondingly set based on a requirement of an actual status. For example, when the interference intensity indication is between 0 and 1, the threshold may be set to 0.01, 0.005, or the like.

In some embodiments, the CU may alternatively group the at least one DU into the at least one first DU group based on the interference intensity indication reported by the at least one DU and with reference to a historical interference intensity indication report record. In this way, DUs that suffer similar interference are grouped into one group. It should be noted that, the interference intensity indication that is received by the CU and that is reported by the at least one DU is currently received, and the historical interference intensity indication report record is reported before the at least one DU reports the interference intensity indication. For example, the historical interference intensity indication report record may include an interference intensity indication that is used by the CU to group the DU for the last time.

In some other embodiments, the CU may alternatively group the at least one DU into the at least one first DU group based on only the historical interference intensity indication report record or with reference to the historical interference intensity indication report record. For example, when the DU controlled by the CU receives a notification of an RS, the CU groups the at least one DU into the at least one first DU group based on the historical interference intensity indication report record of the DU. The historical interference intensity indication report record may include an interference intensity indication that is used by the CU to group the DU for the last time.

It should be noted that, in this embodiment of this application, after obtaining the at least one first DU group, the CU may perform interference management based on the obtained at least one first DU group, or may report a DU grouping status to the controller, and the controller further groups DUs in a plurality of gNBs. For example, when the CU reports the DU grouping status to the controller, the controller further groups the DUs in the plurality of gNBs. For details, refer to operation 604 to operation 606.

Operation 604: The CU sends, to the controller, a distributed unit grouping indication and an interference intensity indication that corresponds to the at least one first DU group. The distributed unit grouping indication is used to indicate the at least one first DU group.

It should be noted that, the interference intensity indication that is sent by the CU to the controller and that corresponds to the at least one first DU group is an interference intensity indication corresponding to each of the at least one first DU group, or may be an interference intensity indication of each DU included in each DU group. For example, the CU groups the at least one DU into a first DU group 1, a first DU group 2, and a first DU group 3. The first DU group 1 includes a DU 0 and a DU 1, the first DU group 2 includes a DU 2, and the first DU group 3 includes a DU 3 and a DU 4. In this case, an interference intensity indication corresponding to the first DU group 1 may be an interference intensity indication of the DU 0, an interference intensity indication of the DU 1, or an interference signal intensity indication obtained after a preset operation is performed on the interference intensity indication of the DU 0 and the interference intensity indication of the DU 1. A manner of the preset operation is not limited in this embodiment of this application. For example, the preset operation may be a weighted average algorithm.

Operation 605: The controller receives the distributed unit grouping indication and the interference intensity indication that corresponds to the at least one first DU group that are reported by the at least one CU, and determines at least one second DU group based on the distributed unit grouping indication and the interference intensity indication that corresponds to the at least one first DU group that are reported by the at least one CU.

Operation 606: The controller allocates at least one specific identifier, where each of the at least one specific identifier is used to identify a second DU group.

In the foregoing manner, DUs in a plurality of different gNBs are grouped. When the solution in this embodiment of this application is applied to a remote interference management process, the remote interference management process is performed for each DU group, thereby helping reduce an amount of information processed by the CU and improve device performance.

For example, the controller receives a distributed unit grouping indication 1, an interference intensity indication corresponding to a first DU group 1 connected to a CU 1, and a first DU group 2 connected to the CU 1 that are reported by the CU 1, a distributed unit grouping indication 2, an interference intensity indication corresponding to a first DU group 1 connected to a CU 2, and a first DU group 2 connected to the CU 2 that are reported by the CU 2. The distributed unit grouping indication 1 is used to indicate the first DU group 1 and the first DU group 2 that are connected to the CU 1, and the distributed unit grouping indication 2 is used to indicate the first DU group 1 and the first DU group 2 that are connected to the CU 2. In this case, if the interference intensity indication corresponding to the first DU group 1 connected to the CU 1 is similar to or the same as the interference intensity indication corresponding to the first DU group 1 connected to the CU 2, the first DU group 1 connected to the CU 1 and the first DU group 1 connected to the CU 2 are aggregated to a second DU group 1. If the interference intensity indication corresponding to the first DU group 2 connected to the CU 1 is different from the interference intensity indication corresponding to the first DU group 2 connected to the CU 2, the first DU group 2 connected to the CU 1 is a second DU group 2, and the first DU group 2 connected to the CU 2 is a second DU group 3. In this case, the controller separately allocates a specific identifier 1 to the second DU group 1, allocates a specific identifier 2 to the second DU group 2, and allocates a specific identifier 3 to the second DU group 3. The specific identifier 1 is used to identify the second DU group 1, the specific identifier 2 is used to identify the second DU group 2, and the specific identifier 3 is used to identify the second DU group 3.

Particularly, when the controller receives a grouping unit grouping indication and an interference intensity indication that corresponds to at least one first DU group that are reported by a CU, at least one second DU group determined by the controller may be the at least one first DU group. For example, when the controller receives a distributed unit grouping indication 0, an interference intensity indication corresponding to a DU 1 group, and an interference intensity indication corresponding to a DU 2 group that are reported by a CU 0, the controller determines that the DU 1 group is a second DU group a, and the DU 2 group is a second DU group b. In this case, the controller separately allocates a specific identifier a to the second DU group a, and allocates a specific identifier b to the second DU group b. The specific identifier a is used to identify the second DU group a, and the specific identifier b is used to identify the second DU group b.

It should be noted that, the specific identifier may also be referred to as a set identifier (set ID), a DU group identifier, a DU cluster identifier, or the like. A name of the specific identifier is not limited in this embodiment of this application.

In some embodiments, the controller further establishes an identifier relationship matching table for each specific identifier. The identifier relationship matching table includes at least a correspondence between a specific identifier and an identifier of a DU, or a correspondence between a specific identifier and an identifier of a CU.

For example, a specific identifier 1 is used to identify a second DU group 1. The second DU group 1 includes a DU 1, a DU 2, a DU 3, a DU 4, a DU 5, and a DU 6. A CU 1 is configured to manage or control the DU 1 and the DU 2, a CU 2 is configured to manage or control the DU 3, the DU 4, and the DU 6, and a CU 3 is configured to manage or control the DU 5. It may alternatively be understood that, the CU 1, the DU 1, and the DU 2 belong to one gNB, the CU 2, the DU 3, the DU 4, and the DU 6 belong to one gNB, and the CU 3 and the DU 5 belong to one gNB. For example, an identifier relationship matching table established by the controller for the specific identifier 1 may be shown in Table 3.

TABLE 3

| Specific identifier 1 | Identifier of the DU 1 |
|---|---|
| | Identifier of the DU 2 |
| | Identifier of the DU 3 |
| | Identifier of the DU 4 |
| | Identifier of the DU 5 |
| | Identifier of the DU 6 |

For another example, an identifier relationship matching table established by the controller for the specific identifier 1 may alternatively be shown in Table 4.

TABLE 4

| Specific identifier 1 | Identifier of the CU 1 |
|---|---|
| | Identifier of the CU 2 |
| | Identifier of the CU 3 |

For still another example, an identifier relationship matching table established by the controller for the specific identifier 1 may alternatively be shown in Table 5.

TABLE 5

| Specific identifier 1 | Identifier of the DU 1 | Identifier of the CU 1 |
|---|---|---|
| | Identifier of the DU 2 | |
| | Identifier of the DU 3 | Identifier of the CU 3 |
| | Identifier of the DU 4 | |
| | Identifier of the DU 6 | |
| | Identifier of the DU 5 | Identifier of the CU 3 |

When the grouping method in this embodiment of this application is applied to a process of a remote interference principle, the controller may further determine, for each of at least one specific identifier allocated for a second DU group, a specific CU in at least one CU configured to manage a DU included in the second DU group. The specific CU is configured to perform information exchange with an aggressor in the remote interference management process. Using a specific identifier 0 as an example, the specific identifier 0 is used to identify a second DU group 0. The second DU group 0 includes a DU 1, a DU 2, a DU 3, a DU 4, a DU 5, a DU 6, a DU 7, a DU 8, and a DU 9. A CU 1 is configured to manage or control the DU 1 and the DU 2, a CU 2 is configured to manage or control the DU 3, the DU 4, and the DU 6, and a CU 3 is configured to manage or control the DU 5, the DU 7, the DU 8, and the DU 9. In this case, the controller determines a specific CU in the CU 1, the CU 2, and the CU 3 for the specific identifier 0, to perform information exchange with an aggressor in a remote interference management process. For example, the specific CU is configured to manage a largest quantity of distributed units. Using the specific identity 0 as an example, the specific CU is the CU 3 in the CU 1, the CU 2, and the CU 3. For another example, the specific CU may alternatively be configured to manage a DU that suffers interference with a greatest intensity. For example, when the DU 1 suffers interference with a greatest intensity in the DU 1 to the DU 9, the specific CU is the CU 1. For still another example, when there are at least two CUs, configured to manage a largest quantity of DUs, in the CU 1, the CU 2, and the CU 3, a CU configured to manage a DU that suffers interference with a greatest intensity is determined in the at least two CUs configured to manage the largest quantity of DUs as the specific CU. In addition, in this embodiment of this application, the specific CU may alternatively be determined in another manner. It should be noted that, the specific CU may also be referred to as a cluster head or another name. This is not limited herein.

In some embodiments, the controller may further send the specific identifier to the specific CU, so that the specific CU determines that DU grouping is completed, and the remote interference management process can be performed. In this case, after receiving the specific identifier, the specific CU may further send the specific identifier to another CU configured to manage the DU in the second DU group identified by the specific identifier, so that the another CU can learn that the remote interference management process is initiated. After completing the remote interference management process, the specific CU sends a remote interference management process end indication to the another CU configured to manage the DU in the second DU group identified by the specific identifier, so that the another CU can determine that the interference management process ends. In addition, the controller may further send the identifier relationship matching table to the specific CU.

For example, using Table 5 as an example, the specific CU is the CU 3. In this case, the controller sends the specific identifier 1 to the CU 3, and the CU 3 sends the specific identifier to the CU 1 and the CU 2.

In some other embodiments, the controller may alternatively send the specific identifier to each CU configured to manage the second DU group identified by the specific identifier. In this case, the CU may read, by using the specific identifier, the identifier relationship matching table established in the controller, to determine whether the CU is the specific CU. Using Table 5 as an example, the controller sends the specific identifier 1 to the CU 1, the CU 2, and the CU 3. In addition, the controller may further send the identifier relationship matching table to each CU that corresponds to the second DU group.

In some other embodiments, the controller may alternatively send the specific identifier to the DU included in the second DU group identified by the specific identifier. After receiving the specific identifier, the DU sends the specific identifier to the CU that manages the DU. In this case, the CU may further read, based on the specific identifier, the identifier relationship matching table established in the controller, to determine whether the CU is the specific CU. Using Table 5 as an example, the controller may alternatively send the specific identifier 1 to at least one of the DU 1 or the DU 2, at least one of the DU 3, the DU 4, the DU 6, or the DU 6. Then, the DU receiving the specific identifier 1 sends the specific identifier to a CU managing the DU. For example, the DU 1 receives the specific identifier 1, and sends the specific identifier 1 to the CU 1. In addition, the controller may further send the identifier relationship matching table to the specific CU or each CU that corresponds to the second DU group.

It should be noted that, after receiving the specific identifier, the CU determines that the controller completes the DU grouping. In this case, when the CU is the specific CU, the CU may initiate the remote interference management process. When the CU is not the specific CU, the CU determines that the specific CU may initiate the remote interference management process. In some embodiments, the controller does not update the identifier relationship matching table in the remote interference management process, to help reduce a possibility that an error occurs in remote interference management.

For example, when the CU receives the at least one specific identifier, the CU sends, to the at least one DU, a notification for suspending the report of the interference intensity indication. Using Table 5 as an example, when the CU 1 receives the specific identifier 1, the CU 1 sends, to the DU 1 and the DU 2, the notification for suspending the report of the interference intensity indication. After receiving the notification for suspending the report of the interference intensity indication, the DU 1 and the DU 2 suspend measurement of the first parameter value, or suspend the report of the interference intensity indication to the CU 1.

For another example, in this embodiment of this application, after allocating the specific identifier, the controller may alternatively send, to the at least one DU, a notification for suspending the report of the interference intensity indication. After receiving the notification for suspending the report of the interference intensity indication or an indication for initiating that the remote interference management process is started, the DU may suspend measurement of the first parameter value, or suspend the report of the interference intensity indication to the CU 1.

In a possible implementation, after determining that the remote interference management process ends, the CU sends, to the DU, a notification for reporting the interference intensity indication, so that the DU can restart to obtain the first parameter value through measurement, or report the interference intensity indication to the CU again. It should be understood that, when the CU is the specific CU, if the CU receives that sending of the RS is stopped, the CU determines that the remote interference management process ends. When the CU is not the specific CU, when the CU receives a notification, sent by the specific CU, indicating that the remote interference management process ends, the CU determines that the remote interference management process ends.

In addition, in this embodiment of this application, the controller may alternatively send, to the DU based on a preconfigured policy, a notification for reporting the interference intensity indication, so that the DU can start to obtain the first parameter value through measurement. For example, the controller may periodically send or send in an event-triggered manner, to the DU, the notification for reporting the interference intensity indication.

In some other embodiments, the CU does not control the DU to report the interference intensity indication. In the remote interference management process, the CU may not perform an operation for grouping the DU, or may not report the distributed unit grouping indication to the controller, or may not perform another operation. Therefore, the controller cannot update the identifier relationship matching table in a process of performing the remote interference management process.

Embodiment 2

A DU may report an interference intensity indication to a controller, to group the DU, so that a CU performs a remote interference management process for each DU group, thereby helping reduce an amount of processed information, and improving performance of a base station. It should be noted that, for a specific implementation of the controller in this embodiment of this application, refer to the specific implementation in Embodiment 1 of this application.

Figure 7:
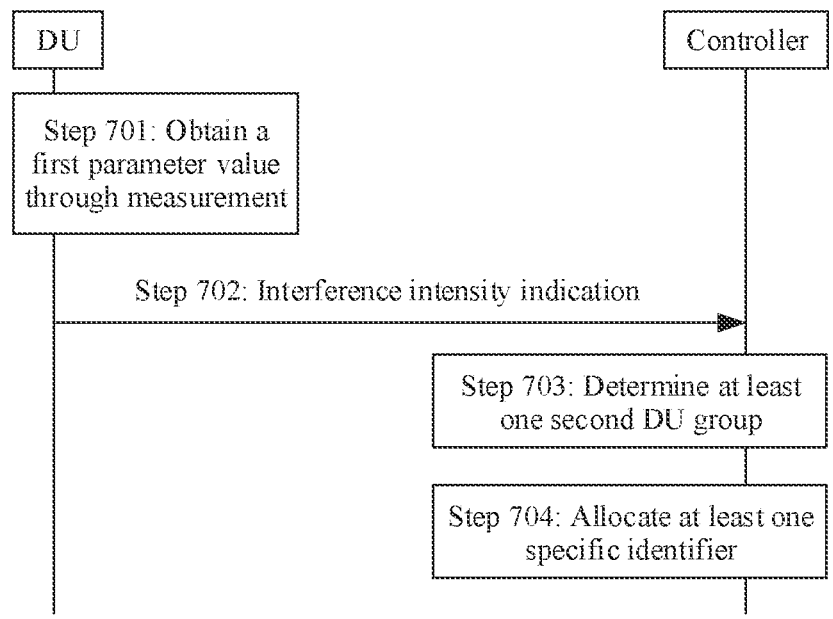
FIG. 7 is a schematic flowchart of another grouping method according to an embodiment of this application.

Specifically, a grouping method in Embodiment 2 of this application may be shown in FIG. 7, and the grouping method includes the following operations:

Operation 701: The DU obtains a first parameter value through measurement, where the first parameter value indicates an intensity of interference suffered by the DU.

It should be noted that, for a specific implementation of operation 701, refer to the specific implementation of operation 601 in Embodiment 1.

Operation 702: The DU reports the interference intensity indication to the controller, where the interference intensity indication is determined based on the first parameter value.

It should be noted that, in operation 702, the DU may report the interference intensity indication to the controller by using the CU, or may directly report the interference intensity indication to the controller.

When the DU reports the interference intensity indication to the controller by using the CU, for a manner in which the DU reports the interference intensity indication to the CU, refer to the manner in which the DU reports the interference intensity indication to the CU in Embodiment 1.

In addition, for a manner in which the DU is triggered to report the interference intensity indication to the controller, and a specific implementation of the interference intensity indication, refer to the related implementations in Embodiment 1.

Operation 703: After receiving an interference intensity indication reported by at least one DU, the controller groups the at least one DU into at least one DU group based on the interference intensity indication reported by the at least one DU.

It may be understood that, the interference intensity indication that is reported by the at least one DU and that is received by the controller may be interference intensity indications reported by DUs in different gNBs, so that the controller can group the DUs in the different gNBs. For a specific manner in which the controller groups the at least one DU into the at least one DU group based on the interference intensity indication reported by the DU, refer to the manner of grouping the at least one DU into the at least one first DU group in Embodiment 1.

Operation 704: The controller allocates a specific identifier to each of the at least one DU group, where the specific identifier is used to identify a DU group, and DU groups identified by different specific identifiers are different.

It should be noted that, for related descriptions of operation 704 in Embodiment 2 of this application, refer to the related descriptions of operation 606 in Embodiment 1.

For a related operation performed after operation 704 in Embodiment 2 of this application, refer to the related implementation in Embodiment 1. Details are not described herein again.

In addition, in this embodiment of this application, if a first specific CU in a victim area initiates a remote interference management process, each DU included in a DU group identified by a first specific identifier is notified to send a reference signal (for example, an RS). An identifier of the first specific CU is associated with the DU group identified by the first specific identifier. In addition, the reference signal includes the first specific identifier. For a manner of obtaining the first specific identifier, refer to the obtaining manner in Embodiment 1 or Embodiment 2 of this application.

After a second specific CU in an aggressor area detects a reference signal sent by a first DU, the second specific CU sends a first message to the first specific CU based on the first specific identifier. The first message includes a second specific identifier. The second specific identifier is used to indicate a DU group associated with an identifier of the second specific CU. The first DU is a DU included in the DU group identified by the first specific identifier.

In some embodiments, the first specific identifier may be associated with the identifier of the first specific CU. In some other embodiments, the second specific CU may obtain the identifier of the first specific CU from the controller based on the first specific identifier.

Figure 2:
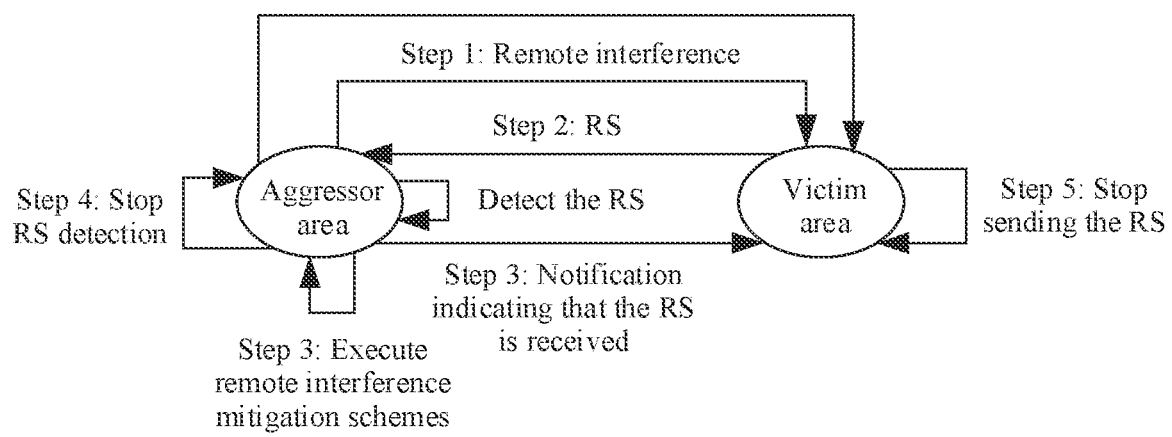
FIG. 2 is a schematic diagram of a remote interference management process.
Figure 3:
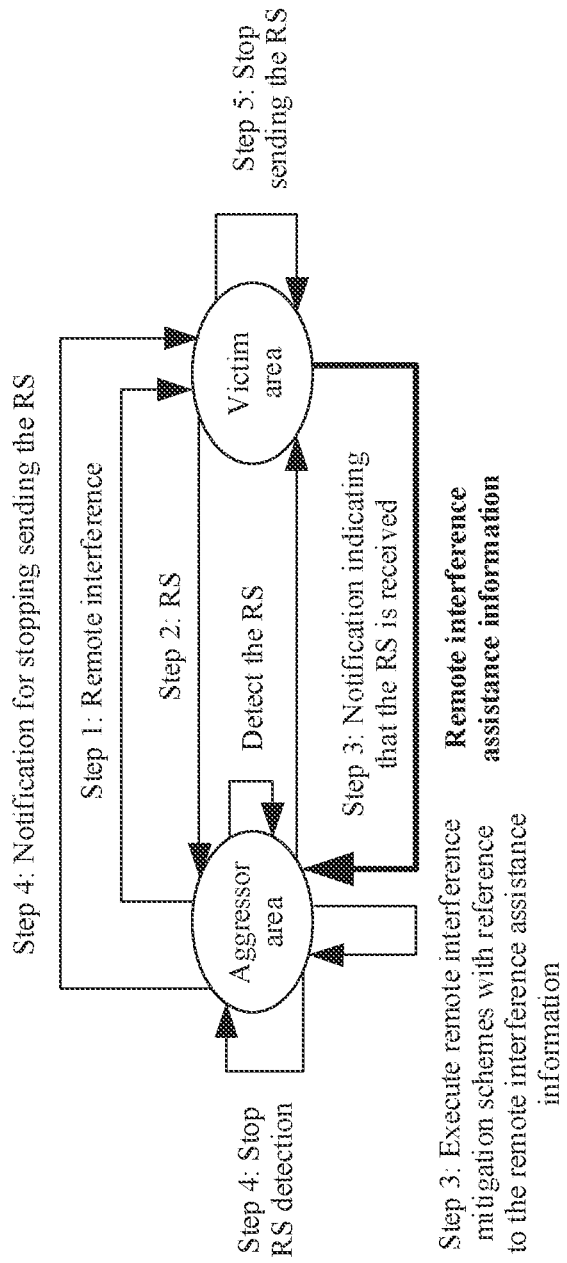
FIG. 3 is a schematic diagram of another remote interference management process.

It should be noted that, the first message may further include a notification, sent by a CU in an aggressor area to a CU in a victim area, indicating that an RS is received in operation 3 in a remote interference management process shown in FIG. 2 or FIG. 3. It should be understood that, the first message may be an existing message, or may be a newly defined message.

The first specific CU may directly send the first message to the second specific CU. Using FIG. 5a as an example, the first specific CU may send the first message to the second specific CU through an Xn interface. The first specific CU may alternatively send the first message to the second specific CU by using a core network. Using FIG. 5b as an example, the first specific CU may send the first message to a core network device 1 (for example, an AMF 1) through an NG interface, then the core network device 1 sends the first message to a core network device 2 (for example, an AMF 2), and finally the core network device 2 forwards the first message to the second specific CU through an NG interface.

For example, when the first message is a newly defined message, the newly defined message may be defined by defining a new class 2 element procedure in a communications protocol. For example, in the communications protocol, a operation in which a CU sends a first message to an AMF may be defined as a RIM Information Indication procedure, and a operation in which the AMF forwards the first message to the CU may be defined as a RIM Information Transfer procedure. In the communications protocol, it may be agreed that, the first message transmitted in the RIM Information Indication procedure may be referred to as a RIM INFORMATION INDICATION message, and the first message forwarded in the RIM Information Transfer procedure may be referred to as a RIM INFORMATION TRANSFER message.

In a specific implementation, the new class 2 element procedure may be defined by defining Table 6 in the communications protocol.

TABLE 6

| Elementary procedure | Message |
| --- | --- |
| RIM Information Indication | RIM INFORMATION INDICATION |
| RIM Information Transfer | RIM INFORMATION TRANSFER |

The RIM INFORMATION INDICATION message and the RIM INFORMATION TRANSFER message include at least the second specific identifier. It should be understood that, the second specific identifier is an information element included in the RIM INFORMATION INDICATION message and the RIM INFORMATION TRANSFER message. For example, the second specific identifier may also be referred to as an Aggressor set ID IE. However, in a specific implementation, when the second specific identifier is not included in the first message sent by the specific CU in the aggressor area to the CU in the victim area in operation 3 shown in FIG. 2 or FIG. 3, but is sent in another operation, for example, the RIM INFORMATION INDICATION message and the RIM INFORMATION TRANSFER message are messages sent in another operation, that the RIM INFORMATION INDICATION message and the RIM INFORMATION TRANSFER message include the Aggressor set ID IE is not necessary. For example, that the RIM INFORMATION INDICATION message includes the Aggressor set ID IE is not necessary may be defined by defining Table 7 in the communications protocol.

TABLE 7

| IE/Group name | Presence |
| --- | --- |
| Aggressor set ID | O |

It should be noted that, in Table 7, that Presence is O indicates that that the RIM INFORMATION INDICATION message includes the Aggressor set ID IE is optional.

For another example, that the RIM INFORMATION TRANSFER message includes the Aggressor set ID IE is not necessary may be defined by defining Table 8 in the communications protocol.

TABLE 8

| IE/Group name | Presence |
| --- | --- |
| Aggressor set ID | O |

It should be noted that, in Table 8, that Presence is O indicates that that the RIM INFORMATION TRANSFER message includes the Aggressor set ID IE is optional.

It should be noted that, in Embodiment 1 and Embodiment 2 of this application, related descriptions are provided from a perspective of a base station in the victim area. For a base station in the aggressor area, for manners of grouping a DU, allocating a specific identifier, sending the specific identifier, establishing an identifier relationship matching table, determining a specific CU, and so on, refer to the related descriptions in Embodiment 1 and Embodiment 2 of this application.

In addition, in a scenario in which a gNB is not CU-DU, the gNB may perform interference measurement, and report an interference intensity indication to a controller. The controller groups at least one gNB reporting an interference intensity indication. Specifically, for a manner in which the gNB performs interference measurement, refer to the manner in which the DU obtains the first parameter value through measurement in the foregoing embodiments. For a manner in which the gNB reports the interference intensity indication, refer to the manner in which the DU reports the interference intensity indication in the foregoing embodiments. For a manner in which the controller groups the gNB, refer to the manner in which the controller groups the DU. For manners of allocating a specific identifier, sending the specific identifier, establishing an identifier relationship matching table, determining a specific gNB, and so on, refer to the related descriptions in Embodiment 1 and Embodiment 2 of this application. It should be understood that, for a specific identifier, the specific identifier may be associated with an identifier of a corresponding specific gNB.

The embodiments of this application may be used separately, or may be used in combination, to achieve different technical effects.

In the foregoing embodiments provided in this application, the method provided in the embodiments of this application is described. To implement the foregoing functions in the methods provided in the embodiments of this application, a corresponding device (for example, a distributed unit, a central unit, or a controller) may include at least a hardware structure or a software module, and implement the foregoing functions in a form of the hardware structure, the software module, or a combination of the hardware structure and the software module. Whether a specific function of the foregoing functions is performed by the hardware structure, the software module, or the combination of the hardware structure and the software module depends on a specific application and a design constraint of the technical solution.

Figure 8:
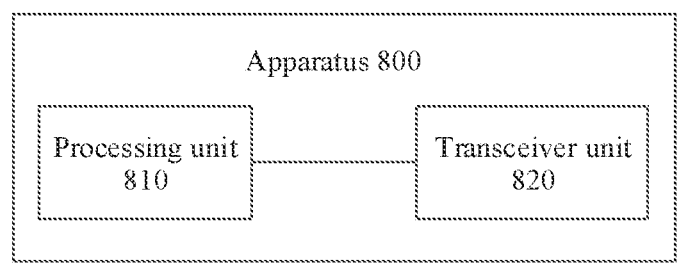
FIG. 8 is a schematic structural diagram of an apparatus according to an embodiment of this application.
Figure 9:
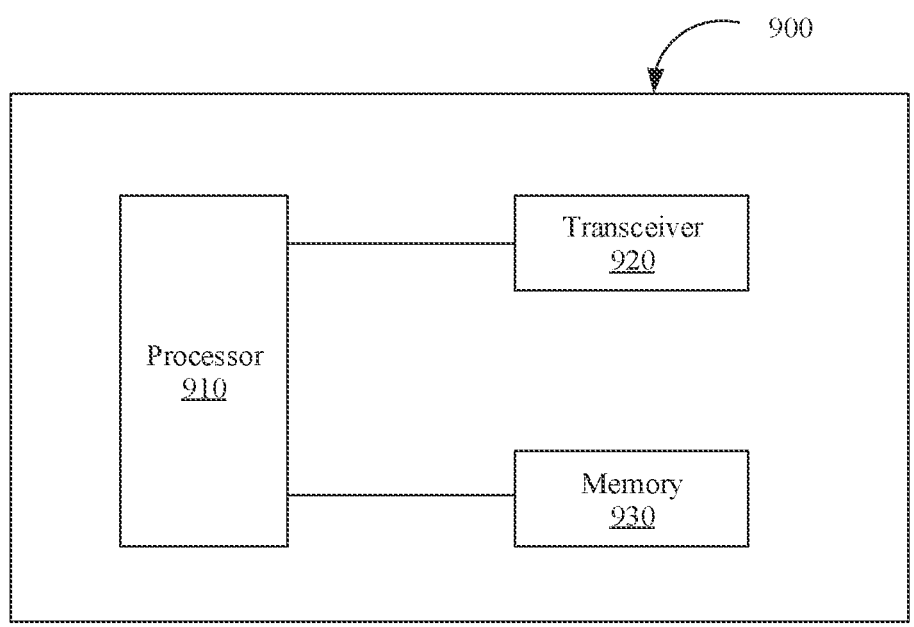
FIG. 9 is a schematic structural diagram of another apparatus according to an embodiment of this application.

The following describes in detail communications apparatuses in the embodiments of this application with reference to FIG. 8 and FIG. 9.

Based on a same inventive concept as the foregoing method embodiments, FIG. 8 is a schematic structural diagram of an apparatus 800 according to an embodiment of this application. Specifically, the apparatus 800 includes a transceiver unit 820 and a processing unit 810.

In some embodiments, when the apparatus is configured to perform the operations performed by the DU in the grouping method shown in FIG. 6 or FIG. 7, the processing unit 810 is configured to perform operation 601 or operation 701, and the transceiver unit 820 is configured to perform operation 602 or operation 702. In some embodiments, when the apparatus is configured to perform the operations performed by the controller in the grouping method shown in FIG. 6 or FIG. 7, the processing unit 810 is configured to perform operation 605 and operation 606, or operation 703 and operation 704, and the transceiver unit 820 is configured to perform operation 604 or operation 702. In some embodiments, when the apparatus is configured to perform the operations performed by the CU in the grouping method shown in FIG. 6, the processing unit 810 is configured to perform operation 603, and the transceiver unit 820 is configured to perform operation 602 and operation 604.

It should be noted that, the apparatus 800 may be a chip, or may be a device.

It should be understood that, in a specific implementation, a hardware implementation of the processing unit 810 may be a processor, and a hardware implementation of the transceiver unit 820 may be a transceiver.

FIG. 9 is a schematic structural diagram of another apparatus 900 according to an embodiment of this application. As shown in FIG. 9, the apparatus 900 may include a processor 910, a transceiver 920, and a memory 930. The transceiver 920 is configured to receive and send information, and may include a receiver and a transmitter. The memory 930 may be configured to store a program/code that is pre-installed when the apparatus 900 is delivered from a factory, or store code executed by the processor 910, or the like.

The processor 910 is configured to execute, in combination with the transceiver 920, the program/code stored in the storage 930, to implement the grouping method in the embodiments of this application. The processor 910 may be an integrated circuit chip and has a signal processing capability. For example, the processor 910 may be a general-purpose processor, a digital signal processor (DSP), an application-specific integrated circuit (ASIC), a field programmable gate array (FPGA) or another programmable logic component, a discrete gate or a transistor logic device, or a discrete hardware component. The processor 910 may implement or perform the methods, operations, and logical block diagrams that are disclosed in the embodiments of this application. The general-purpose processor may be a microprocessor, any conventional processor, or the like. The operations of the method disclosed with reference to the embodiments of this application may be directly executed and completed by a hardware decoding processor, or may be executed and completed by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory, and completes the operations in the foregoing methods in combination with hardware of the processor.

It may be understood that, the memory 930 in this embodiment of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through illustrative but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that, the memory of the systems and methods described in this specification includes but is not limited to these memories and any memory of another proper type.

It should be noted that, although only the processor 910, the transceiver 920, and the memory 930 are shown in the apparatus 900 shown in FIG. 9, in a specific implementation process, a person skilled in the art should understand that the apparatus 900 further includes another component required for implementing normal running. In addition, based on a specific requirement, a person skilled in the art should understand that the apparatus 900 may further include a hardware component implementing another additional function. In addition, a person skilled in the art should understand that the apparatus 900 may alternatively include only components or modules necessary for implementing this embodiment of this application, and does not need to include all the components shown in FIG. 9.

It should be understood that, the apparatus 900 in this embodiment of this application may be configured to perform the operations performed by the distributed unit in the grouping method shown in FIG. 6 or FIG. 7, or may be configured to perform the operations performed by the controller in the grouping method shown in FIG. 6 or FIG. 7, or may be configured to perform the operations performed by the central unit in the grouping method shown in FIG. 6.

A person of ordinary skill in the art may understand that all or some of the processes of the methods in the embodiments may be implemented by a computer program instructing relevant hardware. The program may be stored in a computer-readable storage medium. When the program runs, the processes of the embodiments of the methods are included. The foregoing storage medium may be a magnetic disk, an optical disk, a ROM, a RAM, or the like.

An embodiment of this application further provides a computer program product. When the computer program product is executed by a computer, the method according to any one of the method embodiments is implemented.

An embodiment of this application further provides a communications system. The communications system includes the apparatus 800 or the apparatus 900.

It should be understood that, the apparatus 800 and the apparatus 900 may be configured to implement the grouping method in the embodiments of this application. For related features, refer to the foregoing descriptions. Details are not described herein again.

A person skilled in the art may clearly learn that the embodiments of this application may be implemented by using hardware, firmware, or a combination thereof. When the embodiments of this application are implemented by using software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium that can be accessed by a computer. For example, the computer-readable medium may include, but is not limited to, a RAM, a ROM, an electrically erasable programmable read-only memory (EEPROM), a compact disc read-only memory (CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as the computer-readable medium. For example, if the software is transmitted from a website, a server, or another remote source by using a coaxial cable, an optical fiber/cable, a twisted pair, a digital subscriber line (DSL), or a wireless technology such as infrared, radio, or microwave, the coaxial cable, the optical fiber/cable, the twisted pair, the DSL, or the wireless technology such as infrared, radio, or microwave are included in a definition of a medium to which the coaxial cable, the optical fiber/cable, the twisted pair, the DSL, or the wireless technology such as infrared ray, radio, or microwave belongs. A disk and a disc that are used in the embodiments of this application include a compact disc (CD), a laser disc, an optical disc, a digital versatile disc (DVD), a floppy disk, and a Blu-ray disc. The disk usually magnetically copies data, and the disc optically copies data in a laser manner. The foregoing combination shall also be included in the protection scope of the computer-readable medium.

In summary, the foregoing descriptions are merely the embodiments of this application, but are not intended to limit the protection scope of this application. Any modification, equivalent replacement, or improvement made based on the disclosure of this application shall fall within the protection scope of this application.

What is claimed is:

1. A grouping method, wherein the method comprises:
   receiving, by a central unit of a base station, wherein the base station comprises the central unit and at least one distributed unit, wherein each distributed unit among the at least one distributed unit is separately connected to the central unit, a first interference intensity indication reported by at least one distributed unit;
   grouping, by the central unit, the at least one distributed unit into at least one first distributed unit group based on the first interference intensity indication reported by the at least one distributed unit; and
   sending, by the central unit to a controller in a system comprising the controller and the base station, a distributed unit grouping indication and a second interference intensity indication that corresponds to the at least one first distributed unit group, wherein the distributed unit grouping indication is used to indicate the at least one first distributed unit group.

2. The method according to claim 1, wherein the grouping, by the central unit, the at least one distributed unit into at least one first distributed unit group based on the first interference intensity indication comprises:
   grouping, by the central unit, the at least one distributed unit into the at least one first distributed unit group based on the first interference intensity indication and a historical interference intensity indication report record.

3. The method according to claim 1, wherein the first interference intensity indication is received by the central unit within duration specified for a timing clock, and wherein the timing clock is started when the central unit receives a particular interference intensity indication.

4. The method according to claim 1, wherein the receiving, by a central unit, a first interference intensity indication reported by at least one distributed unit comprises:
   periodically receiving, by the central unit, interference intensity indications reported by the at least one distributed unit.

5. The method according to claim 1, wherein the method further comprises:
   receiving, by the central unit, at least one specific identifier, wherein each of the at least one specific identifier is used to identify a second distributed unit group, wherein second distributed unit groups identified by different specific identifiers are different, and wherein the second distributed unit group is determined by the controller based on an additional distributed unit grouping indication and an additional interference intensity indication that are reported by at least one central unit.

6. The method according to claim 5, wherein after the receiving, by the central unit, at least one specific identifier, the method further comprises:
   sending, by the central unit to the at least one distributed unit, a notification for suspending report of interference intensity indications.

7. The method according to claim 5, wherein the at least one specific identifier is associated with an identifier of the central unit.

8. The method according to claim 1, wherein the method further comprises:
   after receiving a notification indicating that a remote interference management process ends, sending, by the central unit to the at least one distributed unit, a notification for reporting interference intensity indications.

9. A grouping method performed by a controller in a system, the system comprising the controller and N base stations, wherein each base station among the N base stations comprises one central unit among N central units and at least one distributed unit, wherein each distributed unit among the at least one distributed unit is separately connected to the central unit of the corresponding base station, wherein N is a positive integer, wherein the method comprises:
   receiving, by the controller, a distributed unit grouping indication and an interference intensity indication that corresponds to at least one first distributed unit group that are sent by each of N central units, wherein the distributed unit grouping indication is used to indicate that at least one first distributed unit group into which the at least one distributed unit of the base station, among the N base stations, having sent the distributed unit grouping indication and the interference intensity indication to the controller is grouped;
   determining, by the controller, M second distributed unit groups based on the distributed unit grouping indication and the interference intensity indication that corresponds to the at least one first distributed unit group that are sent by each of the N central units, wherein M is a positive integer; and
   allocating, by the controller, M specific identifiers, wherein there is a one-to-one correspondence between the M specific identifiers and the M second distributed unit groups, wherein each specific identifier among the M specific identifiers is used to identify a different second distributed group among the M second distributed unit groups.

10. The method according to claim 9, wherein a first specific identifier is any one of the M specific identifiers, and wherein the method further comprises:
   sending, by the controller for the first specific identifier, the first specific identifier to at least one of the N central units, wherein the at least one of the N central units is configured to manage a distributed unit comprised in a second distributed unit group identified by the first specific identifier; or
   sending, by the controller for the first specific identifier, the first specific identifier to a distributed unit comprised in a second distributed unit group identified by the first specific identifier.

11. The method according to claim 9, wherein the method further comprises:

establishing, by the controller, an identifier relationship matching table for each of the M specific identifiers, wherein the identifier relationship matching table comprises at least one of a correspondence between a specific identifier and an identifier of a distributed unit or a correspondence between a specific identifier and an identifier of a central unit.

12. The method according to claim 9, wherein the method further comprises:

determining, by the controller for each of the M specific identifiers, a specific central unit in at least one central unit configured to manage a distributed unit comprised in a second distributed unit group, wherein the specific central unit is configured to perform information exchange with an aggressor in a remote interference management process for the second distributed unit group.

13. The method according to claim 12, wherein the specific central unit is configured to manage at least one of a largest quantity of distributed units or a distributed unit that suffers greatest interference.

14. The method according to claim 9, wherein the controller comprises an operation, administration and maintenance (OAM) function.

15. A central unit of a base station, the base station comprising the central unit and at least one distributed unit, wherein each distributed unit among the at least one distributed unit is separately connected to the central unit, and wherein the central unit is configured to:

receive a first interference intensity indication reported by at least one distributed unit;

group the at least one distributed unit into at least one first distributed unit group based on the first interference intensity indication reported by the at least one distributed unit; and send, to a controller in a system comprising the controller and the central unit, a distributed unit grouping indication and a second interference intensity indication that corresponds to the at least one first distributed unit group, wherein the distributed unit grouping indication is used to indicate the at least one first distributed unit group.

16. The apparatus central unit according to claim 15, wherein the central unit is configured to group the at least one distributed unit into the at least one first distributed unit group based on the first interference intensity indication and a historical interference intensity indication report record.

17. The central unit according to claim 15, wherein the first interference intensity indication is received by a transceiver within duration specified for a timing clock, and wherein the timing clock is started when the transceiver receives a particular interference intensity indication.

18. The central unit according to claim 15, wherein the central unit is configured to periodically receive interference intensity indications reported by the at least one distributed unit.

19. The central unit according to claim 15, wherein the central unit is configured to:

receive at least one specific identifier, wherein each of the at least one specific identifier is used to identify a second distributed unit group, wherein second distributed unit groups identified by different specific identifiers are different, and wherein the second distributed unit group is determined by the controller based on an additional distributed unit grouping indication and an additional interference intensity indication that are reported by at least one central unit.

20. The central unit according to claim 19, wherein the central unit is configured to send, to the at least one distributed unit after receiving the at least one specific identifier, a notification for suspending report of interference intensity indications.

21. The central unit according to claim 19, wherein the at least one specific identifier is associated with an identifier of the central unit.

22. The central unit according to claim 15, wherein the central unit is configured to:

send, to the at least one distributed unit after receiving a notification indicating that a remote interference management process ends, a notification for reporting interference intensity indications.

23. A controller in a system, the system comprising the controller and N base stations, wherein each base station among the N base stations comprises one central unit and at least one distributed unit, wherein each distributed unit among the at least one distributed unit is separately connected to the central unit of the corresponding base station, wherein the controller is configured to:

receive a distributed unit grouping indication and an interference intensity indication that corresponds to at least one first distributed unit group that are sent by each of N central units, wherein N is a positive integer, wherein the distributed unit grouping indication is used to indicate the at least one first distributed unit group into which the at least one distributed unit of a base station, among the N base stations, having sent the distributed unit grouping indication and the interference intensity indication to the controller is grouped; and determine M second distributed unit groups based on the distributed unit grouping indication and the interference intensity indication that corresponds to the at least one first distributed unit group that are sent by each of the N central units, wherein M is a positive integer; and allocate M specific identifiers, wherein there is a one-to-one correspondence between the M specific identifiers and the M second distributed unit groups, wherein each specific identifier among the M specific identifiers is used to identify a different second distributed group among the M second distributed unit groups.

24. The controller according to claim 23, wherein a first specific identifier is any one of the M specific identifiers, and wherein the controller is configured to:

send, for the first specific identifier, the first specific identifier to at least one of the N central units, wherein the at least one of the N central units is configured to manage a distributed unit comprised in a second distributed unit group identified by the first specific identifier; or send, for the first specific identifier, the first specific identifier to a distributed unit comprised in a second distributed unit group identified by the first specific identifier.

25. The controller according to claim 23, wherein the controller is configured to:

establish an identifier relationship matching table for each of the M specific identifiers, wherein the identifier relationship matching table comprises at least one of a correspondence between a specific identifier and an identifier of a distributed unit or a correspondence between a specific identifier and an identifier of a central unit.

26. The controller according to claim 23, wherein the controller is configured to:
- determine, for each of the M specific identifiers, a specific central unit in at least one central unit configured to manage a distributed unit comprised in a second distributed unit group, wherein the specific central unit is configured to perform information exchange with an aggressor in a remote interference management process for the second distributed unit group.

27. The controller according to claim 26, wherein the controller is configured to manage at least one of a largest quantity of distributed units or a distributed unit that suffers greatest interference.

28. The controller according to claim 23, wherein the controller comprises an operation, administration and maintenance (OAM) function.

* * * * *

UNITED STATES PATENT AND TRADEMARK OFFICE
CERTIFICATE OF CORRECTION

PATENT NO. : 11,838,833 B2
APPLICATION NO. : 17/244340
DATED : December 5, 2023
INVENTOR(S) : Jinping Hao et al.

It is certified that error appears in the above-identified patent and that said Letters Patent is hereby corrected as shown below:

In the Claims

Column 29, Line 45, Claim 16, before "central" please delete "apparatus".

Signed and Sealed this
Twenty-fifth Day of June, 2024

Katherine Kelly Vidal
*Director of the United States Patent and Trademark Office*